United States Patent
Tsuzuki et al.

(10) Patent No.: US 8,878,659 B2
(45) Date of Patent: Nov. 4, 2014

(54) VEHICLE PROXIMITY ANNUNCIATOR DEVICE AND METHOD FOR NOTIFYING PROXIMITY OF VEHICLE

(75) Inventors: Haruyuki Tsuzuki, Toyota (JP); Kazuyuki Usami, Ichinomiya (JP)

(73) Assignee: Anden Co., Ltd., Anjo (JP)

( * ) Notice: Subject to any disclaimer, the term of this patent is extended or adjusted under 35 U.S.C. 154(b) by 305 days.

(21) Appl. No.: 13/304,905

(22) Filed: Nov. 28, 2011

(65) Prior Publication Data

US 2012/0146780 A1     Jun. 14, 2012

(30) Foreign Application Priority Data

Dec. 10, 2010   (JP) ................. 2010-275763

(51) Int. Cl.
*B60Q 1/00*     (2006.01)
*B60Q 1/26*     (2006.01)
*B60Q 1/34*     (2006.01)
*B60Q 5/00*     (2006.01)
*G08B 9/20*     (2006.01)
*H04B 1/00*     (2006.01)

(52) U.S. Cl.
CPC ..................................... *B60Q 5/008* (2013.01)
USPC ........... 340/435; 340/463; 340/471; 340/474; 340/901; 340/384.1; 381/86

(58) Field of Classification Search
None
See application file for complete search history.

(56) References Cited

U.S. PATENT DOCUMENTS

| 7,741,962 B2* | 6/2010 | Kalik ............................. 340/438 |
| 8,299,904 B2* | 10/2012 | Konet et al. ................. 340/384.1 |
| 2011/0010269 A1* | 1/2011 | Ballard ...................... 705/26.41 |
| 2012/0050020 A1* | 3/2012 | Konet et al. ................. 340/384.1 |
| 2012/0092185 A1* | 4/2012 | Hayashi et al. ............... 340/904 |
| 2013/0038435 A1* | 2/2013 | Muroya ...................... 340/425.5 |
| 2013/0093578 A1* | 4/2013 | Goto .......................... 340/425.5 |

FOREIGN PATENT DOCUMENTS

| JP | A-05-213112 | 8/1993 |
| JP | A-10-083187 | 3/1998 |
| JP | A-2005-343360 | 12/2005 |
| JP | A-2008-120283 | 5/2008 |

OTHER PUBLICATIONS

Office Action mailed on Dec. 10, 2013 by the Japanese Patent Office in the corresponding Japanese Patent Application No. 2010-275763 (and English translation).

* cited by examiner

*Primary Examiner* — Julie Lieu
(74) *Attorney, Agent, or Firm* — Posz Law Group, PLC

(57) ABSTRACT

A control unit generates an annunciation sound signal including multiple frequency components. A sound emission device emits an annunciation sound to an outside of a vehicle according to the annunciation sound signal. The control unit changes a pitch of the annunciation sound signal according to a vehicle speed and changes an output level of the annunciation sound signal according to the pitch of the annunciation sound signal.

6 Claims, 2 Drawing Sheets

FIG. 3

| VEHICLE SPEED (km/h) | 0 | 1 | 2 | 3 | 4 | 5 | 6 | 7 | ... | 17 | 18 | 19 | 20 | 21 | 22 | 23 | 24 | ... |
|---|---|---|---|---|---|---|---|---|---|---|---|---|---|---|---|---|---|---|
| PITCH VARIABLE RATE | 1.000 | 1.000 | 1.000 | 1.025 | 1.050 | 1.075 | 1.100 | 1.125 | ... | 1.375 | 1.400 | 1.425 | 1.450 | 1.475 | 1.500 | 1.500 | 1.500 | ... |

FIG. 4

| PITCH VARIABLE RATE | 1.000 | 1.025 | 1.050 | 1.075 | 1.100 | 1.125 | 1.150 | 1.175 | 1.200 | 1.225 | 1.250 | 1.275 |
|---|---|---|---|---|---|---|---|---|---|---|---|---|
| CORRECTION MULTIPLICATION RATE | 2.00 | 1.94 | 1.78 | 1.45 | 1.33 | 1.20 | 1.14 | 1.10 | 1.08 | 1.02 | 1.00 | 1.01 |

| PITCH VARIABLE RATE | 1.300 | 1.325 | 1.350 | 1.375 | 1.400 | 1.425 | 1.450 | 1.475 | 1.500 |
|---|---|---|---|---|---|---|---|---|---|
| CORRECTION MULTIPLICATION RATE | 1.02 | 0.98 | 1.00 | 1.04 | 1.12 | 1.21 | 1.30 | 1.36 | 1.39 |

VEHICLE PROXIMITY ANNUNCIATOR DEVICE AND METHOD FOR NOTIFYING PROXIMITY OF VEHICLE

CROSS REFERENCE TO RELATED APPLICATIONS

This application is based on and claims priority to Japanese Patent Application No. 2010-275763 filed on Dec. 10, 2010, the contents of which are incorporated in their entirely herein by reference.

TECHNICAL FIELD

The present invention relates to a vehicle proximity annunciator device equipped in a low noise vehicle, such as an electric vehicle or a hybrid vehicle, and configured to emit an annunciation sound for causing a person outside the vehicle to feel proximity of the vehicle thereby to notify existence of the vehicle. The present invention relates to a method for notifying proximity of the vehicle.

BACKGROUND

In general, an electric vehicle, which is equipped with only an electric motor as a driving source, emits a significantly low traveling sound when traveling at a low speed. Similarly, a hybrid vehicle, which is equipped with an electric motor and an internal combustion engine as driving sources, also emits a significantly low traveling sound when traveling at a low speed only with driving power of the electric motor. Accordingly, a pedestrian or other person may not notice proximity of such a vehicle.

In consideration of this, for example, JP-A-5-213112 discloses a vehicle proximity annunciator device equipped in such a low noise vehicle. The vehicle proximity annunciator device causes a sound emission device such as a speaker or a piezoelectric buzzer to emit an annunciation sound to the outside of the vehicle thereby to notify a pedestrian and the like around the vehicle of existence of the vehicle.

In another example, a vehicle proximity annunciator device is configured to emit a dummy engine sound or a dummy motor sound by generating an annunciation sound being a synthetic sound (chord sound) including multiple frequency components. In another example, a vehicle proximity annunciator device is configured to change the pitch (playback speed) of the annunciation sound according to the vehicle speed to enable a pedestrian and the like to recognize the speed of the vehicle.

It is noted that, such a configuration may be employed to cause a sound emission device to emit a synthetic sound as the annunciation sound and to change the pitch of the annunciation sound according to the vehicle speed, as described above. Nevertheless, in such a configuration, the sound pressure of specific frequency components of the synthetic sound may increase, and the sound pressure of other frequency components of the synthetic sound may decrease, with change in the vehicle speed, due to influence of the frequency characteristic of the sound emission device.

Therefore, the sound pressure of the annunciation sound may become higher or may become lower with increase in the vehicle speed. Alternatively, the sound pressure of the annunciation sound may sharply change with change in the vehicle speed. Consequently, a pedestrian and the like cannot notice proximity of the vehicle easily or may feel the annunciation sound as a noise.

SUMMARY

In view of the foregoing and other problems, it is an object of the present invention to produce a vehicle proximity annunciator device configured to emit a synthetic sound being an annunciation sound, configured to change the pitch of the annunciation sound according to the vehicle speed, and configured to set arbitrarily a relationship between the vehicle speed and the sound pressure of the annunciation sound. It is another object of the present invention to produce a method for notifying proximity of the vehicle.

According to an aspect of the present invention, a vehicle proximity annunciator device comprises a control unit configured to generate an annunciation sound signal including a plurality of frequency components. The vehicle proximity annunciator device further comprises a sound emission device configured to emit an annunciation sound to an outside of a vehicle according to the annunciation sound signal. The control unit is further configured to: change a pitch of the annunciation sound signal according to a vehicle speed; and change an output level of the annunciation sound signal according to the pitch of the annunciation sound signal.

According to an aspect of the present invention, a method for notifying proximity of a vehicle, the method comprises generating an annunciation sound signal including a plurality of frequency components. The method further comprises changing a pitch of the annunciation sound signal according to a speed of the vehicle. The method further comprises changing an output level of the annunciation sound signal according to the pitch of the annunciation sound signal. The method further comprises emitting an annunciation sound with the changed pitch at the changed output level to an outside of the vehicle.

BRIEF DESCRIPTION OF THE DRAWINGS

The above and other objects, features and advantages of the present invention will become more apparent from the following detailed description made with reference to the accompanying drawings. In the drawings:

FIG. 3 is a view showing a correspondence between a pitch variable rate and a vehicle speed; and FIG. 4 is a view showing a correspondence between a correction multiplication rate and the pitch variable rate.

DETAILED DESCRIPTION

Embodiment

Figure 1:
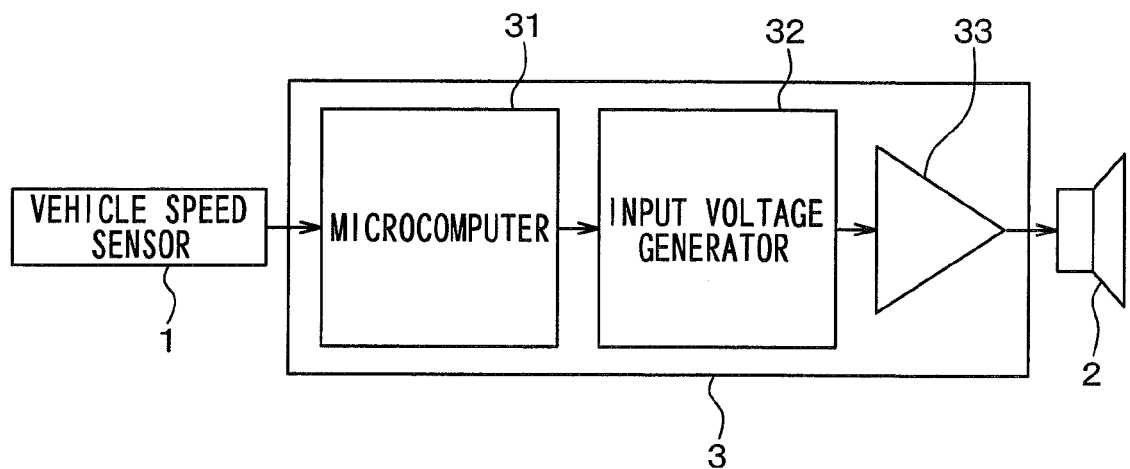
FIG. 1 is a block diagram showing a configuration of a vehicle proximity annunciator device.

As follows, an embodiment will be described. FIG. 1 is a block diagram showing a vehicle proximity annunciator device according to an embodiment.

The vehicle proximity annunciator device is equipped in an electric vehicle, which includes only an electric motor as a driving source, or a hybrid vehicle, which includes an electric motor and an internal combustion engine as driving sources. As shown in FIG. 1, the vehicle proximity annunciator device includes a vehicle speed sensor 1, a speaker 2, and an electronic control unit (ECU) 3.

The vehicle speed sensor 1 outputs a vehicle speed pulse according to a traveling speed of the vehicle. The speaker 2 is, for example, located in a front bumper to function as a sound emission device for emitting an annunciation sound to the outside of the vehicle.

Figure 2:
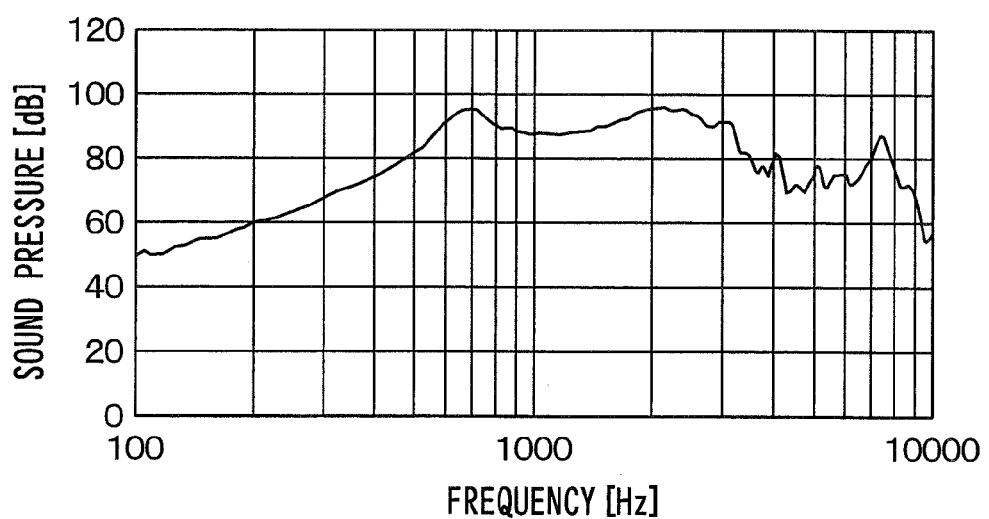
FIG. 2 is a graph showing a sound pressure of a speaker shown in FIG. 1 and a frequency characteristic.

In the present example, the speaker 2 has a sound-pressure-frequency characteristic shown in FIG. 2. Specifically, in the sound pressure-frequency characteristic, the sound pressure changes approximately linearly relative to change in frequency in a low frequency range, such as several hundred hertz to eight hundred hertz, and the sound pressure changes non-linearly relative to change in frequency in a high frequency range.

The ECU 3 includes electronic components such as a microcomputer 31 including a CPU, a RAM, a ROM, an EEPROM, and the like, a power amplifier input voltage generator 32, and a power amplifier 33.

The microcomputer 31 generates annunciation sound data and outputs the generated annunciation sound data to the power amplifier input voltage generator 32. The annunciation sound data is pulse-code modulation data (PCM data). The power amplifier input voltage generator 32 implements D/A conversion of the annunciation sound data to generate an annunciation sound signal and outputs the annunciation sound signal to the power amplifier 33 for generating the annunciation sound. The power amplifier 33 amplifies the annunciation sound signal and outputs the amplified annunciation sound signal to the speaker 2.

As follows, an operation of the ECU 3 will be described. The memory of the microcomputer 31 stores reference annunciation sound data being a source of the annunciation sound data. The reference annunciation sound data includes multiple frequency components in a low frequency range and a high frequency range. The reference annunciation sound data is specified with an output level and a pitch (playback speed). As follows, the output level of the reference annunciation sound data is denoted by a reference output level, and a pitch of the reference annunciation sound data is denoted by a reference pitch.

FIG. 3 shows a correspondence between a pitch variable rate for correcting the pitch of the annunciation sound data and the vehicle speed. FIG. 4 shows a correspondence between a correction multiplication rate for correcting the output level of the annunciation sound data and the pitch variable rate. The correspondences shown in FIGS. 3, 4 are stored in the memory of the microcomputer 31.

The microcomputer 31 first determines the pitch variable rate for correcting the pitch of the annunciation sound data outputted to the power amplifier input voltage generator 32. Specifically, the microcomputer 31 calculates the vehicle speed according to a signal outputted from the vehicle speed sensor 1 and reads the pitch variable rate corresponding to the calculated vehicle speed from the correspondence of FIG. 3. An actual pitch of the annunciation sound data outputted to the power amplifier input voltage generator 32 is the product of the reference pitch and the pitch variable rate.

In the example in FIG. 3, the annunciation sound is changed to a high frequency sound relatively with increase in the vehicle speed thereby to enable a pedestrian to recognize the speed of the vehicle. More specifically, when the vehicle speed is 0 to 2 km/h, the pitch variable rate is set at 1.0. When the vehicle speed is greater than or equal to 3 km/h, the pitch variable rate is gradually increased with increase in the vehicle speed. When the vehicle speed is greater than or equal to 22 km/h, the pitch variable rate is set at 1.5.

Subsequently, the microcomputer 31 calculates the correction multiplication rate for correcting the output level of the annunciation sound data outputted to the power amplifier input voltage generator 32. Specifically, the microcomputer 31 reads the correction multiplication rate corresponding to the pitch variable rate, which is set previously, from the correspondence of FIG. 4. An actual output level of the annunciation sound data outputted to the power amplifier input voltage generator 32 is the product of the reference output level and the correction multiplication rate.

The correction multiplication rate in the present example is a correction value for causing the sound pressures substantially constantly (substantially uniformly) when respectively setting the pitch variable rates specified in FIG. 3. The correction multiplication rates can be determined by actually measuring sound pressures when respectively setting the pitch variable rates specified in FIG. 3.

Subsequently, the microcomputer 31 modifies the reference annunciation sound data inputted from the memory, thereby to generate the annunciation sound data at the output level determined according to the pitch variable rate, which is determined according to the vehicle speed. Thus, the microcomputer 31 outputs the annunciation sound data to the power amplifier input voltage generator 32.

The power amplifier input voltage generator 32 implements D/A conversion to the annunciation sound data to generate the annunciation sound signal. The power amplifier 33 amplifies the generated annunciation sound signal and sends to the speaker 2. Thus, the speaker 2 emits the annunciation sound being a synthetic sound to the outside of the vehicle.

In the present configuration, the pitch and the output level of the annunciation sound date are controlled and changed (modified). Thereby, the pitch and the output level of the annunciation sound signal are changed. Thus, the pitch and the output level of the annunciation sound are changed.

In the present embodiment, the vehicle proximity annunciator device is configured to generate an annunciation sound being a synthetic sound and to change the pitch of the annunciation sound according to the vehicle speed. Thereby, the vehicle proximity annunciator device enables to control the sound pressure of the annunciation sound at substantially constant level, irrespective of the vehicle speed.

In the embodiment, the sound pressure of the annunciation sound is controlled at a substantially constant level, irrespective of the vehicle speed. It is noted that, the data of the correction multiplication rates in the correspondence shown in FIG. 4 may be modified thereby to cause the sound pressure of the annunciation sound to increase or decrease with increase in the vehicle speed.

Specifically, for example, a load noise increases with increase in the vehicle speed. In consideration of this, the sound pressure of the annunciation sound may be reduced with increase in the vehicle speed, thereby to cause a person not to feel the annunciation sound as a noise. Alternatively, for example, a degree of hazard becomes higher with increase in the vehicle speed. In consideration of this, the sound pressure of the annunciation sound may be increased with increase in the vehicle speed, thereby to notify existence of the vehicle outside a vehicle more steadily.

In the embodiment, the vehicle speed is calculated according to the signal from the vehicle speed sensor 1. It is noted that the vehicle speed information may be retrieved as communication data from an ECU other than the vehicle proximity annunciator device, via a data communication link.

In the embodiment, the speaker 2 is used as a sound emission device. Alternatively, a piezoelectric buzzer may be used as the sound emission device.

Summarizing the above embodiment, the vehicle proximity annunciator device includes: the control unit 3 configured to generate the annunciation sound signal including multiple frequency components; and the sound emission device 2 configured to emit the annunciation sound to the outside of the vehicle according to the annunciation sound signal. The control unit 3 is further configured to: i) change the pitch of the annunciation sound signal according to the vehicle speed; and ii) change the output level of the annunciation sound signal according to the pitch of the annunciation sound signal.

With the present configuration, for example, the sound pressure of the annunciation sound can be controlled substantially at a constant level, irrespective of the vehicle speed. In general, a load noise becomes louder with increase in the vehicle speed. Therefore, the sound pressure of the annunciation sound may be reduced with increase in the vehicle speed thereby to cause a person, such as a pedestrian, not to feel the annunciation sound as a noise. In general, a degree of hazard becomes greater with increase in the vehicle speed. Therefore, the sound pressure of the annunciation sound may be increased with increase in the vehicle speed thereby to cause a person, such as a pedestrian, to notice existence of the vehicle steadily.

Thus, the vehicle proximity annunciator device, which is configured to emit a synthetic sound being the annunciation sound and configured to change the pitch of the annunciation sound according to the vehicle speed, can be enabled to set the relationship between the vehicle speed and the sound pressure of the annunciation sound, arbitrary in response to various requirements.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle proximity annunciator device comprising:
   a control unit configured to generate an annunciation sound signal including a plurality of frequency components; and
   a sound emission device configured to emit an annunciation sound to an outside of a vehicle according to the annunciation sound signal, wherein
   the control unit is further configured to:
      change a pitch of the annunciation sound signal according to a vehicle speed;
      change an output level of the annunciation sound signal according to the pitch of the annunciation sound signal; and
      determine the pitch of the annunciation sound signal according to:
         a reference pitch of the annunciation sound signal, the reference pitch being assigned with a predetermined pitch; and
         a pitch variable rate selected according to the vehicle speed.

2. The vehicle proximity annunciator device according to claim 1, wherein the control unit is further configured to control the output level of the annunciation sound signal such that a sound pressure of the annunciation sound is substantially constant irrespective of the vehicle speed.

3. The vehicle proximity annunciator device according to claim 1, wherein the control unit is further configured to control the output level of the annunciation sound signal such that a sound pressure of the annunciation sound becomes lower with an increase in the vehicle speed.

4. The vehicle proximity annunciator device according to claim 1, wherein the control unit is further configured to control the output level of the annunciation sound signal such that a sound pressure of the annunciation sound becomes higher with increase in the vehicle speed.

5. The vehicle proximity annunciator device according to claim 1, wherein the control unit is further configured to obtain the pitch of the annunciation sound signal by multiplying of the reference pitch by a correction multiplication rate uniquely corresponding to the pitch variable rate.

6. A method for notifying proximity of a vehicle, the method comprising:
   generating an annunciation sound signal including a plurality of frequency components;
   changing a pitch of the annunciation sound signal according to a speed of the vehicle;
   changing an output level of the annunciation sound signal according to the pitch of the annunciation sound signal;
   emitting an annunciation sound with the changed pitch at the changed output level to an outside of the vehicle;
   selecting a pitch variable rate according to the speed of the vehicle; and
   obtaining the pitch of the annunciation sound signal by multiplying
      a reference pitch of the annunciation sound signal, the reference pitch being assigned with a predetermined pitch, by
      a correction multiplication rate uniquely corresponding to the selected pitch variable rate.

* * * * *